(No Model.)
G. B. DURKEE.
DRAG SAWING MACHINE.
No. 250,136.  Patented Nov. 29, 1881.
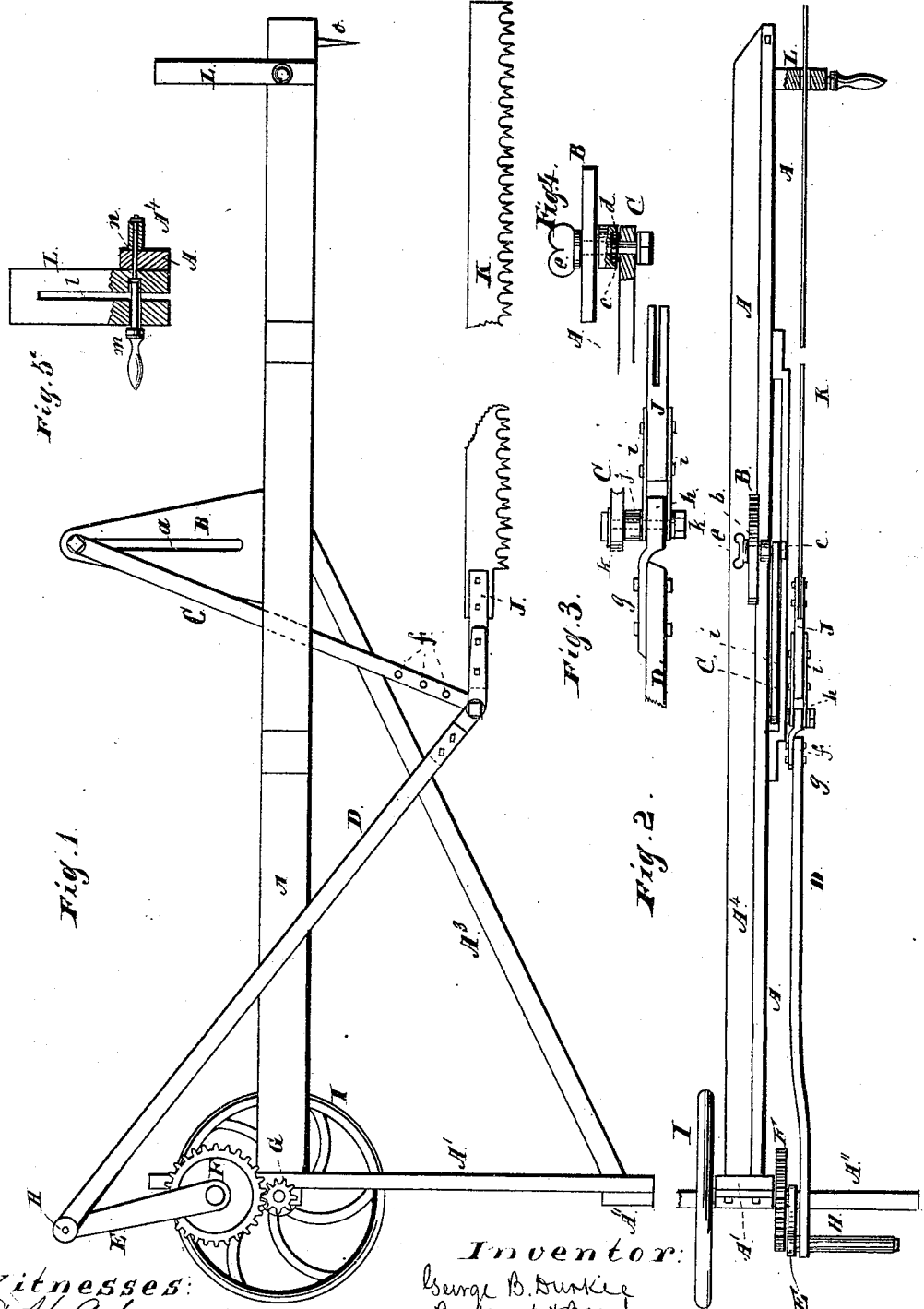

UNITED STATES PATENT OFFICE.

GEORGE B. DURKEE, OF CHICAGO, ILLINOIS, ASSIGNOR TO THOMAS M. THOMPSON, OF SAME PLACE.

DRAG-SAWING MACHINE.

SPECIFICATION forming part of Letters Patent No. 250,136, dated November 29, 1881.

Application filed March 5, 1881. (No model.)

*To all whom it may concern:*

Be it known that I, GEORGE B. DURKEE, residing at Chicago, in the county of Cook and State of Illinois, and a citizen of the United States, have invented new and useful Improvements in Sawing-Machines, of which the following is a full description, reference being had to the accompanying drawings, in which—

Figure 1 is a side elevation; Fig. 2, a top or plan view; Fig. 3, a detail showing the connection between the swinging bar, pitman, and saw-clamp; Fig. 4, a detail showing the connection of the swinging bar with the upright; Fig. 5, a detail, partly in section, showing the support and guide for the saw at the front end of the frame.

This invention relates to sawing-machines designed or intended to be operated by hand or other light motive power, and which, when desired, can be readily and quickly moved along the log or timber being operated upon, or from place to place, when required, and has for its object to improve, perfect, and simplify the construction of the operating parts and render the operation more effective and reliable, and give the saw a freer movement and a longer and better stroke, and have it capable of being readily adjusted and arranged to operate on logs or timbers of varying diameters and dimensions without liability of becoming twisted or bound when adjusted to work in different positions or at different heights, or becoming otherwise inoperative from such change in its working position.

The improvements will be fully hereinafter described in detail, and specifically pointed out in the claims.

In the drawings, A represents the longitudinal or main bar or piece of the frame; A', the support or standard for the rear end of the main bar; A'', the cross-piece for preventing tipping; A$^3$, the brace; A$^4$, the strengthening-piece; B, the upright; C, the swinging bar; D, the pitman; E, the arm for operating the pitman; F, the gear-wheel to which the arm E is connected; G, the gear-wheel for imparting motion to the fly-wheel; H, the crank for driving the wheel F; I, the fly-wheel; J, the saw-clamp; K, the saw; L, the guide and support for the saw at the forward end of the bar A; $a$, the slot in the upright B; $b$, the bearing or guard block; $c$, the clamping-bolt; $d$, the shoulder or collar on the bolt $c$; $e$, the clamp or thumb nut; $f$, the adjusting-holes in the bar C; $g$, the curved connecting-strap for the pitman; $h$, the head of the strap $g$; $i$, the side plates of the saw-clamp; $j$, the anti-friction washer; $k$, the clamping-bolt for connecting the pitman D; $l$, the slot in the guide L; $m$, the pin for holding the saw in the slot $l$; $n$, the bolt or rivet for attaching the block L to the bar A; $o$, the point or spike for attaching the bar A to the log.

The longitudinal bar A, support A', cross-piece A'', and brace A$^3$ may be arranged as shown, or in some other corresponding manner form a frame or support which will combine lightness with strength and leave the forward end of the bar A free to rest on the log or timber. As shown, a backing-piece, A$^4$, is secured to the side of the bar A, to make it stronger and prevent it from bending or curving between its forward and rear end in the operation of sawing.

The upright B is secured to the bar A, at or near its center longitudinally, by means of bolts or otherwise, so as to be firm and rigid, and is provided with a slot, $a$, extending nearly its entire length. To this upright B is pivotally connected the upper end of a bar, C, the connection, as shown, being made by means of a bolt, $c$, having thereon a collar or flange, $d$, the stem of the bolt on one side of the collar receiving the end of the bar C, and on the other passing through the slot $a$, and receiving on its projecting end a set or thumb nut, $e$.

Between the face of B and the shoulder $d$ on the stem of the bolt is located a block, $b$, which acts as a bearing or guard to enable the bolt to act and do its work in securing the bar to the upright without affecting the pivotal attachment of the bar to the bolt. By this arrangement the bar is firmly attached and held in position, and at the same time is left perfectly free to swing from its pivot, and by means of the slot $a$ its point of attachment can be readily and quickly changed to cause its lower end to swing in the arc of a circle, either higher or lower, by simply loosening the set or thumb nut $e$ and raising or lowering the bolt $c$ in the slot, and when the desired position is reached again tightening the nut $e$. This piece C extends below the bar or piece A, and is held so as to swing in a vertical plane by passing through an opening or slot formed between the frame A and a return or side piece secured to A by bolts or otherwise, so as to leave a clear space for the piece C to swing forward and back.

To the lower end of C is pivotally connected the forward end of a pitman, D, the rear end of which is pivotally connected to the outer end of an arm, E, which is secured to and revolves with a gear-wheel, F, so as to give the pitman a reciprocating movement and cause it to operate the bar C and the saw. The wheels F are revolved by means of a crank, H, attached to its shaft, which shaft is mounted in a suitable bearing located on the post or standard A' of the frame. This wheel F gears with a smaller wheel, G, the shaft of which is also mounted in a suitable bearing on A' and projects beyond the piece, and has mounted on its opposite end a fly-wheel, I, the object of which is to lessen the amount of power required to operate the saw, and to give a more steady and uniform movement to the parts by which the saw is operated.

The forward end of the pitman D is secured to a curved connecting-strap, $g\,h$, by means of bolts passing through the pitman and the portion $g$ of the strap, or in some other suitable manner. This strap is so curved that its forward end or portion, $h$, when the parts are together, is directly in front of and in line with the pitman, and this end or head $h$ fits between two plates, $i\,i$, secured to opposite sides of the saw clamp or block, and is pivotally attached and held in position by a bolt, $k$, which bolt is of sufficient length to pass through the bar C and pivotally connect such bar with the pitman and saw clamp or block, an anti-friction washer, $j$, being located on the stem of the bolt between the bar C and plate $i$, to allow perfect freedom of movement and prevent the parts from binding or slipping on the stem of the bolt in use; but a bolt having a collar or enlarged portion on its stem between the plate and bar could be used, or the parts be held in their proper relation in some other suitable manner. The lower end of the bar C, as shown, is provided with a series of holes, $f$, for the bolt $k$, the object of which is to adjust the connection of the pitman, saw-clamp, and bar at this point by making the attachment at a point either higher or lower, as required, to prevent the joint or connection from getting in line and becoming stuck.

The saw clamp or block J has a slot at its forward end to receive the saw K, which saw may be of any of the usual and well-known forms of construction for what are known or termed "crosscut-saws," and this saw is secured on the clamp by means of bolts, as shown, or in some other suitable manner.

The forward end of the bar A is provided with a block or piece, L, secured thereto by means of a bolt, $n$, as shown in Fig. 5, the head of the bolt $n$ coming in contact with the bottom or end of the opening for the pin $m$; but this piece L may be otherwise attached in position. This piece or block L has a slot, $l$, in a vertical line with the saw, and of sufficient width for the saw to enter readily, and near its lower end is a transverse opening or hole extending both sides of the slot $l$, to receive a wooden pin, $m$. The object of this piece or block L is to furnish a means for hanging the saw up when moving the machine around by raising its body into the slot $l$, and then inserting the wooden pin $m$ to prevent it from falling, and the slot $l$ also acts as a guide-slot to prevent the saw from wabbling at the commencement of the sawing and cause it to start properly without assistance from the operator.

In use the forward end of the bar A is spiked or attached to the upper face of the log or timber by driving the point or spike $o$ thereinto, which prevents the frame and machine from sliding forward and back as the saw is operated, and holds it firmly in position for the operation of sawing.

The machine is operated by turning the crank H, which revolves the wheel F, and causes the arm E to reciprocate the pitman D and give the saw a corresponding movement to do its work, and when the cut is complete the machine is moved along on the log or timber to the next sawing-point and again spiked down and the saw operated, which operations are continued until the log or timber is cut up into pieces of the desired length.

By means of the slot $a$ the bar C can be raised or lowered to adjust its height and the height of the saw to the size of the log or timber, the adjustment being easily made by releasing the set or clamp nut of the bolt $c$; and by suspending the saw and the pitman by the bar C it will be seen that these parts have a long free swing, giving the saw a long length of stroke and rendering its operation more rapid and effectual, and by making the bar C adjustable the saw can be gaged so that its inclination will be the proper one in relation to the height of the log or timber and the pitman to have it bear so as to render its stroke an effective one the entire length when the sawing first begins. This adjustment will generally prevent the pivotal connections from getting in line or at a dead-point, so as to be inoperative, and in case the adjustment should be one that would bring two of the pivots in line, the defect can be quickly remedied by changing the adjustment, and such change will not be liable to affect the stroke to any extent, as a very slight change will obviate the difficulty.

By bringing the pitman D back of and in line with the saw it will be seen that the action will be a direct one, that no side pressure can take place to affect the movement or operation of the saw, or cause binding at the joint or pivot at either end of the pitman, and that the bar C is left free to swing in a direct line without hinderance or interference from the stroke of the pitman.

The connection between the pitman and saw clamp or block need not necessarily be the curved strap, as the part $g$ might be a plate extending out from the center of the head $h$ and entering a slot in the end of the pitman, so as to bring the pitman and saw in line and produce a direct action.

The adjustment to prevent binding at the pivotal connections can be made at the holes $f$, when such holes $f$ are used, or at the slot $a$, as may be desired.

What I claim as new, and desire to secure by Letters Patent, is as follows:

1. In a sawing-machine, the horizontal main bar A, provided with the upright B, having the vertical slot $a$, in combination with the depending swinging bar C, having its upper end connected with the upright by a bolt passing through and adjustable in the slot in said upright, a saw-clamp, J, connected with the lower end of the swinging bar, and the pitman D, connected at one end with the lower portion of the swinging bar and at its other end with the driving mechanism, all substantially as described.

2. In a draw-saw, the horizontal main bar A, provided with the upright bar B, having a vertical slot, $a$, in combination with the depending swinging bar C, having its upper end connected with the slotted upright by a bolt, $c$, provided with a set-nut, $e$, for vertically adjusting the same in the slot of the upright, the saw-clamp J, connected with the lower end of the swinging bar, and the pitman D, connected at one end with the crank H, all substantially as described.

3. A sawing-machine consisting of a frame or support, an upright, B, having a slot, $a$, a swinging bar, C, pivotally connected at its upper end with the upright by the bolt $c$, having shoulder or flange $d$, set-nut $e$, and block $b$, pitman D, pivotally connected at its front end by the curved straps $g$ $h$, plates $i$, and bolt $j$, with the saw-clamp K and bar C, and at its rear end with an operating mechanism mounted or carried on the main frame or support, all as described, whereby a direct action is imparted to the saw from the pitman in a line with its reciprocation, as set forth.

GEORGE B. DURKEE.

Witnesses:
ALBERT H. ADAMS,
O. W. BOND.